United States Patent
Rongrong et al.

(10) Patent No.: US 11,720,244 B2
(45) Date of Patent: Aug. 8, 2023

(54) ONLINE CONFERENCE TOOLS FOR MEETING-ASSISTED CONTENT EDITING AND POSTING CONTENT ON A MEETING BOARD

(71) Applicant: Cisco Technology, Inc., San Jose, CA (US)

(72) Inventors: Pan Rongrong, Hefei (CN); Xi Yasi, Anhui Province (CN); Li Bin, Anhui Province (CN); Jian Wang, Anhui (CN)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 17/237,228

(22) Filed: Apr. 22, 2021

(65) Prior Publication Data
US 2022/0342524 A1 Oct. 27, 2022

(51) Int. Cl.
*G06F 3/0486* (2013.01)
*H04L 12/18* (2006.01)
(Continued)

(52) U.S. Cl.
CPC ........ *G06F 3/0486* (2013.01); *H04L 12/1813* (2013.01); *H04L 65/403* (2013.01); *H04L 65/4015* (2013.01); *H04L 67/306* (2013.01)

(58) Field of Classification Search
CPC .............. G06F 3/0486; H04L 65/4015; H04L 12/1813; H04L 65/403; H04L 67/306
See application file for complete search history.

(56) References Cited

U.S. PATENT DOCUMENTS 6,564,246 B1 * 5/2003 Varma .................... G06Q 10/10
709/205
7,360,164 B2 * 4/2008 Bjoernsen .............. G06Q 10/10
709/203
(Continued)

FOREIGN PATENT DOCUMENTS

WO WO-2014152997 A2 * 9/2014 ............. G06F 17/24
WO WO-2022177732 A1 * 8/2022 ........... G06F 3/0484

OTHER PUBLICATIONS

Keep Productive, "What are Zoom Zapps?", Youtube, https://www.youtube.com/watch?v=oOPYyg4hd5A, Oct. 16, 2020, 2 pages.
(Continued)

*Primary Examiner* — Yongjia Pan
(74) *Attorney, Agent, or Firm* — Edell, Shapiro & Finnan, LLC

(57) ABSTRACT

Presented herein are systems and methods that allow for capturing metadata associated with a drag-and-drop action. The metadata includes information about a participant of at least two participants connected, by a collaboration server, to a collaboration session via respective devices. The system and methods further introduce the concept of a meeting board. The collaboration server distributes to the respective devices media stream data representing a main display area and the meeting board section in a user interface screen associated with the collaboration session. Content items of the collaboration session are sequentially displayed in the main display area throughout the collaboration session and a portion of a content item that is drag-and-dropped from the main display area into the meeting board section remains on the meeting board section throughout the collaboration session.

21 Claims, 15 Drawing Sheets

(51) Int. Cl.
*H04L 67/306* (2022.01)
*H04L 65/403* (2022.01)
*H04L 65/401* (2022.01)

(56) References Cited

U.S. PATENT DOCUMENTS

| | | | |
|---|---|---|---|
| 7,571,212 B2* | 8/2009 | Reynolds | H04L 12/1831 709/206 |
| 7,698,660 B2* | 4/2010 | Sanchez | H04L 67/104 715/863 |
| 8,683,351 B2* | 3/2014 | Cheng | G06Q 10/107 715/753 |
| 9,398,059 B2* | 7/2016 | Shepherd | H04L 65/403 |
| 9,489,114 B2* | 11/2016 | Coplen | H04L 51/04 |
| 9,749,367 B1 | 8/2017 | Kirby et al. | |
| 10,229,518 B2* | 3/2019 | Carlos | G06F 40/171 |
| 10,356,363 B2* | 7/2019 | Segal | H04N 21/4722 |
| 10,528,922 B1 | 1/2020 | Narayanaswamy | |
| 11,061,547 B1* | 7/2021 | Fieldman | G06F 3/0488 |
| 11,205,013 B2* | 12/2021 | Lewbel | H04L 12/1822 |
| 2004/0237033 A1* | 11/2004 | Woolf | G06F 40/171 715/211 |
| 2006/0080432 A1* | 4/2006 | Spataro | H04L 67/38 709/224 |
| 2007/0113194 A1* | 5/2007 | Bales | G06F 3/0486 715/769 |
| 2007/0300159 A1* | 12/2007 | Kordun | G06Q 10/10 715/733 |
| 2010/0138756 A1* | 6/2010 | Saund | H04L 12/1827 715/758 |
| 2010/0146118 A1* | 6/2010 | Wie | H04L 67/306 709/225 |
| 2010/0192072 A1 | 7/2010 | Spataro et al. | |
| 2011/0270922 A1* | 11/2011 | Jones | H04L 65/1093 709/204 |
| 2012/0079399 A1* | 3/2012 | Ferman | G06Q 10/109 715/753 |
| 2014/0032677 A1 | 1/2014 | Pittenger et al. | |
| 2014/0047027 A1* | 2/2014 | Moyers | G06F 9/452 709/204 |
| 2014/0310613 A1* | 10/2014 | Megiddo | G06F 40/169 715/753 |
| 2015/0007055 A1* | 1/2015 | Lemus | H04L 65/4015 715/753 |
| 2015/0149404 A1 | 5/2015 | Lock et al. | |
| 2015/0149540 A1* | 5/2015 | Barker | H04L 12/1831 709/204 |
| 2015/0256574 A1* | 9/2015 | Sanchez | H04L 65/403 715/753 |
| 2016/0085381 A1* | 3/2016 | Parker | G06F 8/34 715/753 |
| 2018/0011627 A1* | 1/2018 | Siracusano, Jr. | H04L 12/1813 |
| 2019/0394150 A1 | 12/2019 | Denoue et al. | |
| 2020/0319777 A1* | 10/2020 | Mondri | G06F 3/0482 |
| 2021/0333955 A1* | 10/2021 | Lewbel | G06F 3/0482 |
| 2021/0365629 A1* | 11/2021 | Mott | G06F 16/93 |

OTHER PUBLICATIONS

Spark, "DropBox Integration: Link DropBox Spaces to Single or Recurring Meeting [ Prereq if WEBEX-138653 is committed]," https://jira-eng-gpk2.cisco.com/jira/browse/SPARK-187204, Apr. 23, 2021, 2 pages.

* cited by examiner

ONLINE CONFERENCE TOOLS FOR MEETING-ASSISTED CONTENT EDITING AND POSTING CONTENT ON A MEETING BOARD

TECHNICAL FIELD

The present disclosure relates to online meeting space environments.

BACKGROUND

Virtual meeting space environments allow for online collaboration and collaborative content editing. Online collaboration typically involves a group of geographically remote participants joining an online meeting via respective devices and sharing content. The content may be a presentation or a document that is to be co-edited by various participants. Changes to the content are then saved and available after the online meeting.

DESCRIPTION OF EXAMPLE EMBODIMENTS

Overview

Figure 1:
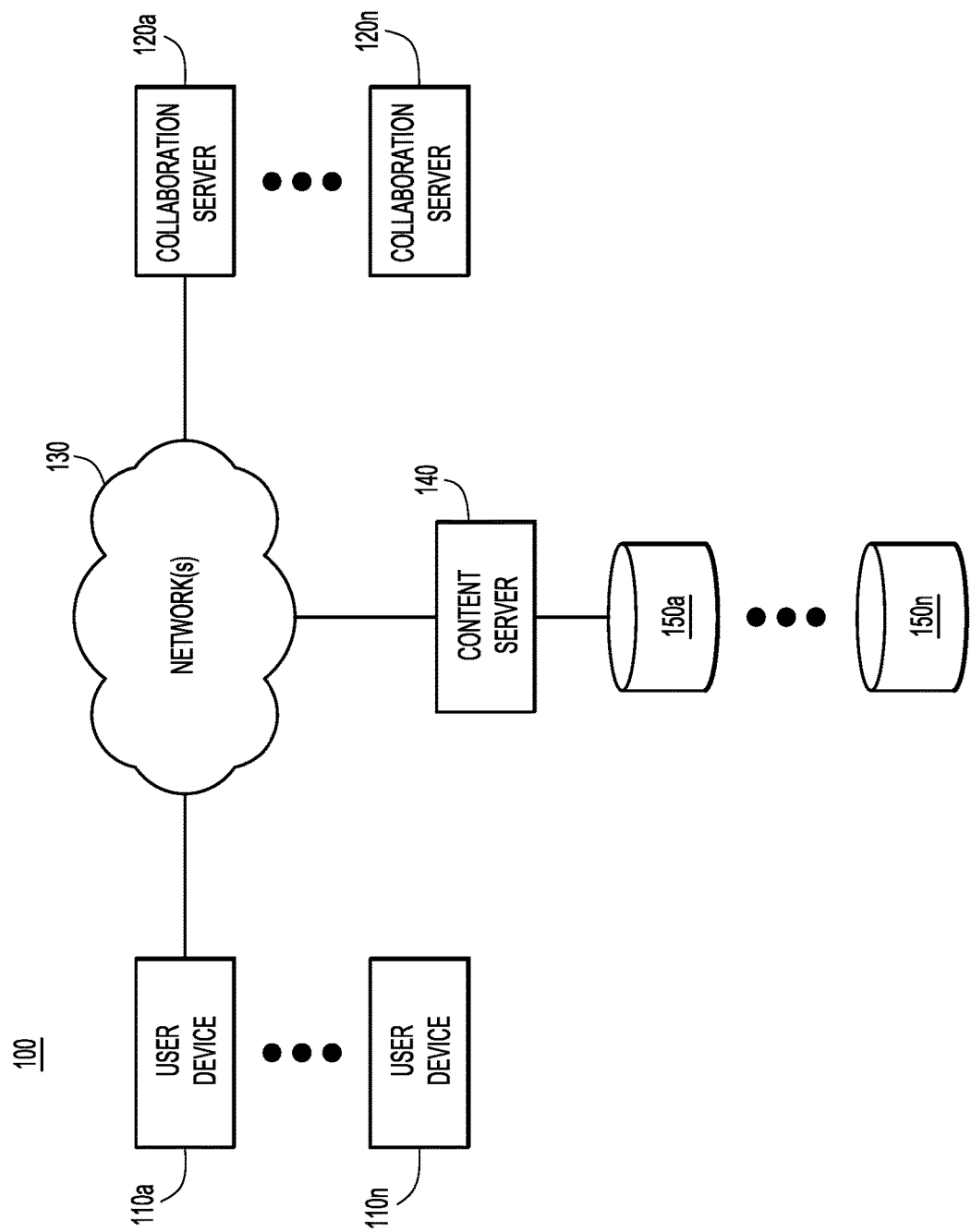
FIG. 1 is a block diagram illustrating a system configured to provide a collaboration session among a plurality of participants, according to an example embodiment.

Briefly, in accordance with one embodiment, systems and methods are provided that provide an enhanced drag-and-drop action during a collaboration session. These methods involve a collaboration server connecting at least two participants via respective devices to a collaboration session in which content is shared among the at least two participants and detecting a drag-and-drop action performed with respect to the content shared in the collaboration session by one of the at least two participants. These methods further involve the collaboration server capturing metadata associated with the drag-and-drop action and embedding, into a media stream associated with the content that is distributed to the respective devices of the at least two participants, the metadata of the drag-and-drop action into the content. The metadata includes information about a participant of the at least two participants.

In accordance with another embodiment, systems and methods are provided that render a portion of content of the collaboration session on a meeting board section throughout the collaboration session. These methods involve the collaboration server connecting at least two participants via respective devices to a collaboration session and distributing, to the respective devices, media stream data representing a main display area and the meeting board section in a user interface screen associated with the collaboration session. A plurality of content items of the collaboration session are sequentially displayed in the main display area throughout the collaboration session. These methods further involve the collaboration server detecting a drag-and-drop action from one of the respective devices, in which at least one portion of a first content item is dragged from the main display area onto the meeting board section. The collaboration server distributes the media stream data by including, in the media stream data, the at least one portion of the first content item in the meeting board section throughout the collaboration session.

Example Embodiments

In an online meeting space environment, participants and/or users (these terms are used interchangeably throughout the description) are participating via their respective devices that may be geographically remote from each other. The participant and the respective user (client) device, such as a computer, laptop, tablet, smart phone, etc., may collectively be referred to as endpoints or devices. The devices may communicate with each other via one or more networks such as the Internet, virtual private network (VPN), and so on.

Some of the devices may have interactive connectivity in a collaboration session. Interactions may include, but are not limited to, manipulating content on a user interface screen to jump to a particular location, zooming, making changes to the actual contents such as adding, deleting, and/or editing contents on the user interface screen, and so on. Other devices may not have the interactive connectivity in the collaboration session and may only have the capability to view content during the collaboration session and/or audio capabilities.

FIG. 1 is a block diagram illustrating a system 100 for providing a collaboration session, according to an example embodiment. The system 100 includes a plurality of user devices (devices) 110a-n, a plurality of collaboration servers 120a-n, a network (or a collection of networks) 130, and a content server 140 having one or more associated databases 150a-n. The notation "a-n" denotes that a number is not limited, can vary widely, and depends on a particular use case scenario.

In the system 100, one or more users may be participating in a collaboration session using their respective devices 110a-n. The collaboration session is managed and/or controlled by the collaboration servers 120a-n. The devices 110a-n communicate with the collaboration servers 120a-n via the networks 130.

The one or more networks 130 may include a local area network (LAN), a wide area network (WAN) such as the Internet, or a combination thereof, and includes wired, wireless, or fiber optic connections. In general, the one or more networks 130 can use any combination of connections and protocols that support communications between the entities of the system 100.

The devices 110a-n may obtain a session identifier and/or an identifier of content, such as a document, corresponding to the session by communicating with the collaboration servers 120a-n. Based on an identifier of the content obtained from the collaboration servers 120a-n, the devices 110a-n may then communicate with the content server 140 to obtain the content/document itself that is stored in one or more databases 150a-n.

In one example embodiment, one or more of the collaboration servers 120a-n may be integrated with the content server 140 into a single device. In another example embodiment, the devices 110a-n communicate with the collaboration servers 120a-n and the collaboration servers 120a-n retrieve and distribute content to the devices 110a-n. In various example embodiments, the collaboration servers 120a-n control a whiteboard to which multiple participants may have access throughout the collaboration session.

According to yet another example embodiment, there may be no centralized deciding entity, such as an arbitration server, that decides which user in a collaboration session is active at any given time. Instead, every device makes its own decision as to which other device is an active user at any given point in time. That is, the collaboration session may operate in a peer-to-peer (P2P) manner where each device broadcasts information to other devices and each device makes independent decisions based on the received information. The device broadcasts pass through the collaboration servers 120a-n that distributes it to other devices in the collaboration session and applies it to the content, which may be displayed on the whiteboard, of the collaboration session.

The collaboration servers 120a-n store identifiers of various collaboration sessions and identifiers of corresponding content (documents) that may be obtained from the databases 150a-n (one or more memories) via the content server 140. For security purposes and to avoid data leakage, the content server 140 does not have decryption capability with respect to the content (documents). The content server 140 controls the storing of the content in an encrypted format. In addition, the content server 140 controls retrieval of the encrypted content for a respective collaboration session and communicates the retrieved content in its encrypted form to the requesting device e.g., via the collaboration servers 120a-n. The devices 110a-n decrypt the received data and encrypt data prior to communicating with the other devices in the collaboration session.

The collaboration servers 120a-n are configured to communicate with various client applications executing on the user devices 110a-n. The client applications running on the user devices 110a-n detect various actions performed by the respective participants during a collaboration session and notify the respective collaboration server associated with the collaboration session about these events. The respective collaboration server may render or display on a user interface screen of the respective device one or more content of the collaboration session. That is, the collaboration server sends commands to the client applications running on the user devices 110a-n to render content in a particular way, to change views, controls, and so on.

The collaboration servers 120a-n control the collaboration sessions by communicating and/or interacting with client applications running on the user devices 110a-n that detect various actions performed by the participants during the collaboration sessions and execute commands and/or instructions for the collaboration sessions as provided by the collaboration servers 120a-n.

A collaboration session is sometimes referred to as a whiteboard session because the collaboration sessions involves not only sharing content, such as a presentation, but also co-editing of content during the collaboration session. A meeting-assisted content co-editing takes place on a whiteboard i.e., the participants collaborate on one or more documents (review, modify, etc.) displayed on the whiteboard. As a result of this collaboration, the content is enhanced and/or revised by joint-effort of all or some participants. The enhanced document is then saved to one or more databases 150a-n via the content server 140 e.g., for future use.

Additionally, many other resources and/or data are generated during the collaboration session. First, real-time transcripts of the collaboration session may be used as a textual source of the document content. Second, desktop/application sharing and annotation or a portion of the sharing/annotation can be used as an image source of the document content. For example, a platform may be provided to aggregate various third party applications. Using this platform, a third party application is selected and a portion of the content (image) is retrieved via this third party application. The portion of the content is then dragged and dropped into the document content of the collaboration session. Third, meeting agenda, meeting chat, meeting participant's profile, meeting participant list is used as an auxiliary source of the document content of the collaboration session. These other resources could be leveraged to facilitate co-editing around one or more documents of the collaboration session.

In existing solutions, participants of a collaboration session manually cut and paste information as needed into a document. Additionally, some content may be drag-anddropped into the document. In the notes section, the participants may manually document the changes being made. These existing solutions do not leverage the above-described resources for document co-editing. Rather, they rely on the participants to manually capture and incorporate the needed information into the document. As such, these existing solutions are cumbersome, time consuming, and error prone.

Techniques presented below provide a mechanism for capturing these resources and making them part of the content. Based on user's intent, metadata associated with one or more drag-and-drop actions in the collaboration session is captured and made part of the content being co-edited. A participant may drag-and-drop any content (include one or more of these resources) into a document of the collaboration session, render it gracefully into the document, and capture corresponding meeting contextual information (metadata) associated with the drag-and-drop action. That is, the techniques capture various sources of data in the collaboration session that contribute to editing the content using drag-and-drop action(s).

FIGS. 2-7 illustrate examples of collaboration sessions in which an online co-editing platform is provided. The co-editing platform is configured to render content to be edited on a whiteboard. In these various example embodiments, the focus of the collaboration sessions is meeting-assisted content editing i.e., participants' primary focus is the content. For example, the participants' work starts with a document and ends with an enhanced and revised version of the document. The collaboration session is a tool to facilitate the process of remotely co-editing content. That is, the collaboration session is "document centric" rather than "meeting centric". The sources of various revisions to the content are captured in various forms and are made part of the content. That is, metadata or contextual information surrounding a modification of the content is captured and rendered in the content itself. Various sources may be added to the content, such as a portion of a real-time meeting transcript described in connection with FIG. 2, information about one or more participants (their profile) described in connection with FIGS. 3 and 4, and/or an image or at least a portion of another content (document), described in connection with FIGS. 5 and 6. The source(s) is added to the content, in various forms, described in connection with FIG. 7. The same numeric references denote the same elements or components throughout the description.

Figure 2:
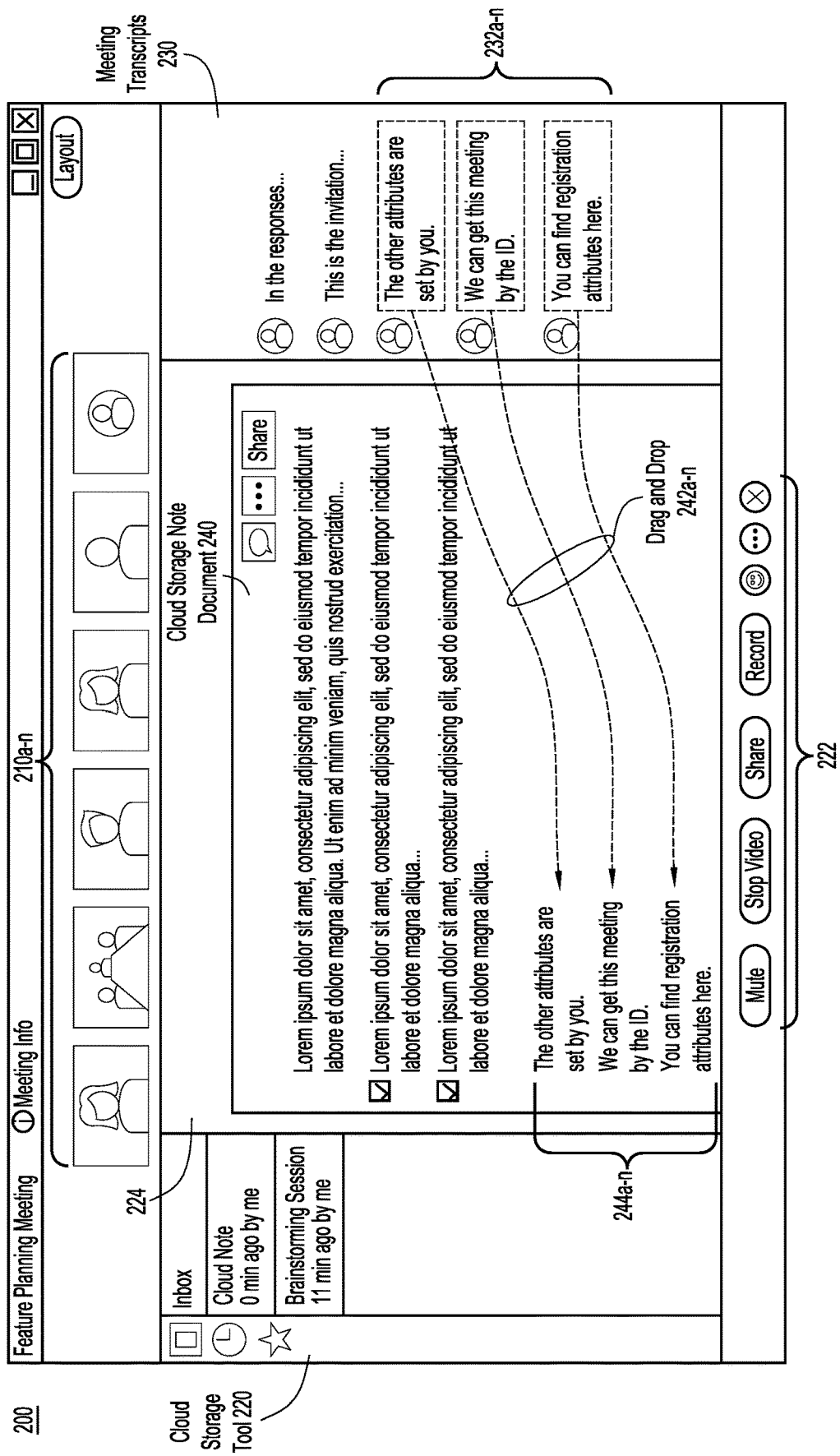
FIG. 2 is a diagram illustrating content associated with a collaboration session in which a portion of a meeting transcript is captured and embedded into a media stream associated with the content of the collaboration session, according to an example embodiment.

Specifically, FIG. 2 is a diagram illustrating a collaboration session 200 in which a portion of a meeting transcript is captured and embedded into a media stream associated with content of the collaboration session 200, according to an example embodiment.

The collaboration session 200 is controlled by the collaboration server such as one of the collaboration servers 120*a-n*. The collaboration server connects participants 210*a-n* to the collaboration session 200 via their respective devices 110*a-n* of FIG. 1. In the collaboration session 200, the collaboration server renders each of the participants 210*a-n* in a form of a live video stream, a frame, an avatar, or a profile image. The collaboration server further renders various tools for the collaboration session 200. The various tools may include a cloud storage tool 220, control tools 222, a whiteboard 224, and a meeting transcript 230. The tools rendered by the collaboration server depend on a particular deployment of a collaboration service and use case scenario.

The cloud storage tool 220 is an access tool to various content of a respective participant of the participants 210*a-n*. The respective participant may share one or more documents on the whiteboard 224 using the cloud storage tool 220.

The control tools 222 allow the respective participant to manipulate the collaboration session 200 and include control functionalities such as share content and/or screen, record content of the collaboration session 200, stop their respective video feed, mute their audio, and so on. The whiteboard 224 may display content shared by one or more of the participants 210*a-n* and/or may serve as a drawing board for the participants 210*a-n* to draw, type, sketch, etc. In the collaboration session 200, the whiteboard 224 displays a cloud storage note document 240 retrieved using the cloud storage tool 220 by one of the participants 210*a-n*.

Additionally, the collaboration server performs speech-to-text conversion of audio portions of a media stream of the collaboration session 200 and renders the text in the meeting transcript 230. The meeting transcript 230 may be split into various portions based on a respective participant and/or time intervals.

During the collaboration session 200, one or more drag-and-drop actions 242*a-n* are performed by one or more of the participants 210*a-n*. When a drag-and-drop action occurs during the collaboration session 200, the collaboration server detects the drag-and-drop action. The collaboration server may detect the drag-and-drop action based on a client application running on a respective device of the participant that detects the drag-and-drop action and provides an indication of this event to the collaboration server.

For example, several parts 232*a-n* of the meeting transcript 230 are dragged and dropped into cloud storage note document 240, as parts 244*a-n* of its content. Information about one or more of the participants 210*a-n* (their audio converted to text) becomes a part of the cloud storage note document 240. In one variation, along with the several parts 232*a-n* of the meeting transcript 230, identification information such as a name of the corresponding participants may also become part of the cloud storage note document 240. Additionally or alternatively, information about a participant that initiated the drag-and-drop action is made part of the cloud storage note document 240.

Figure 3:
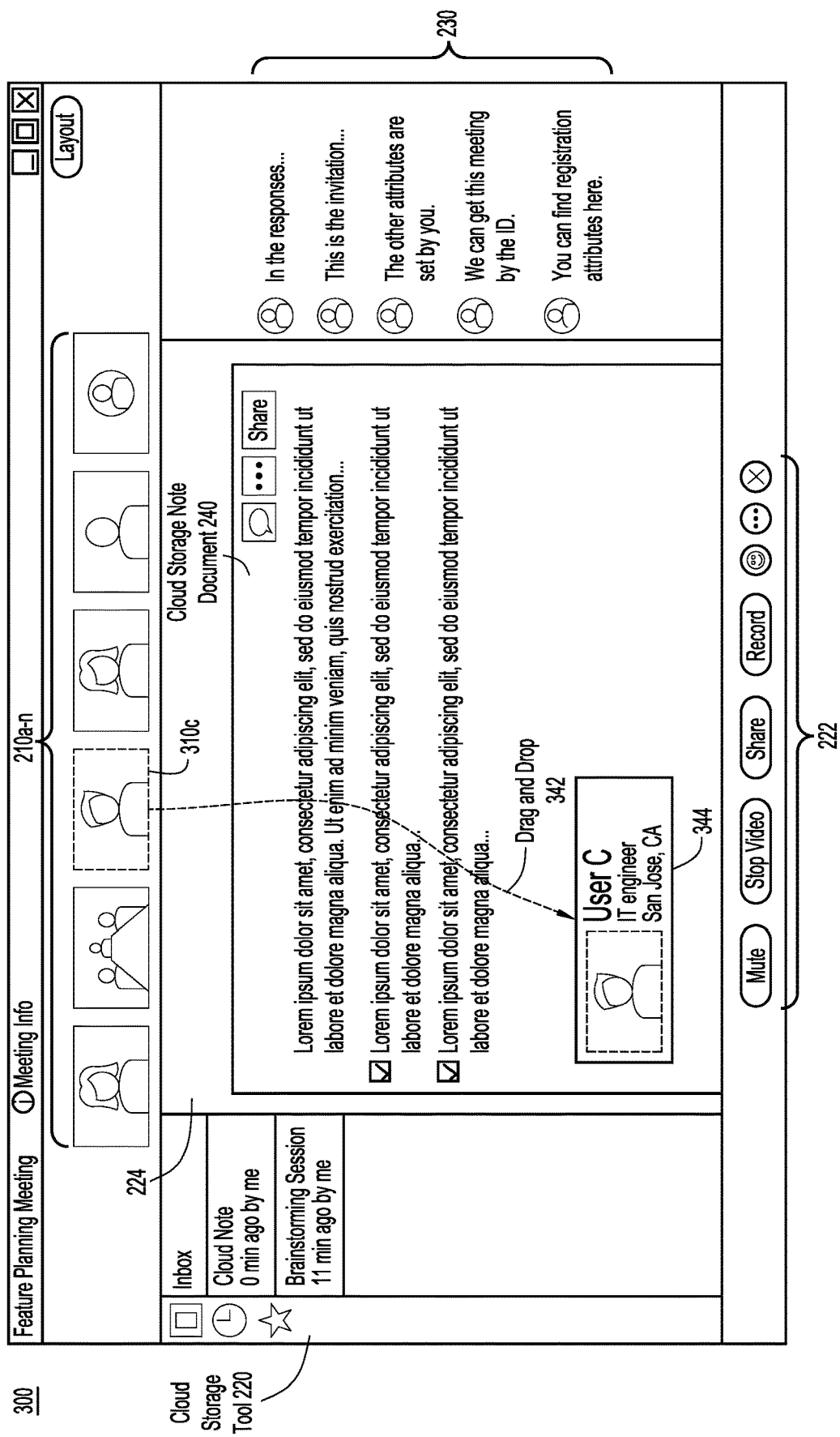
FIG. 3 is a diagram illustrating a collaboration session in which a profile card of a participant is captured and embedded into a media stream associated with content of the collaboration session, according to an example embodiment.

FIG. 3 is a diagram illustrating a collaboration session 300 in which a profile card of a participant is captured and embedded into a media stream associated with content of the collaboration session 300, according to an example embodiment.

In the collaboration session 300, a participant may add a profile card corresponding to one of the participants 210*a-n* into the cloud storage note document 240. In particular, a participant performs a drag-and-drop action 342 in which a participant 310*c* is selected and dragged and dropped into the cloud storage note document 240. Based on this drag-and-drop action 342, a profile card 344 is made part of the cloud storage note document 240.

Figure 4:
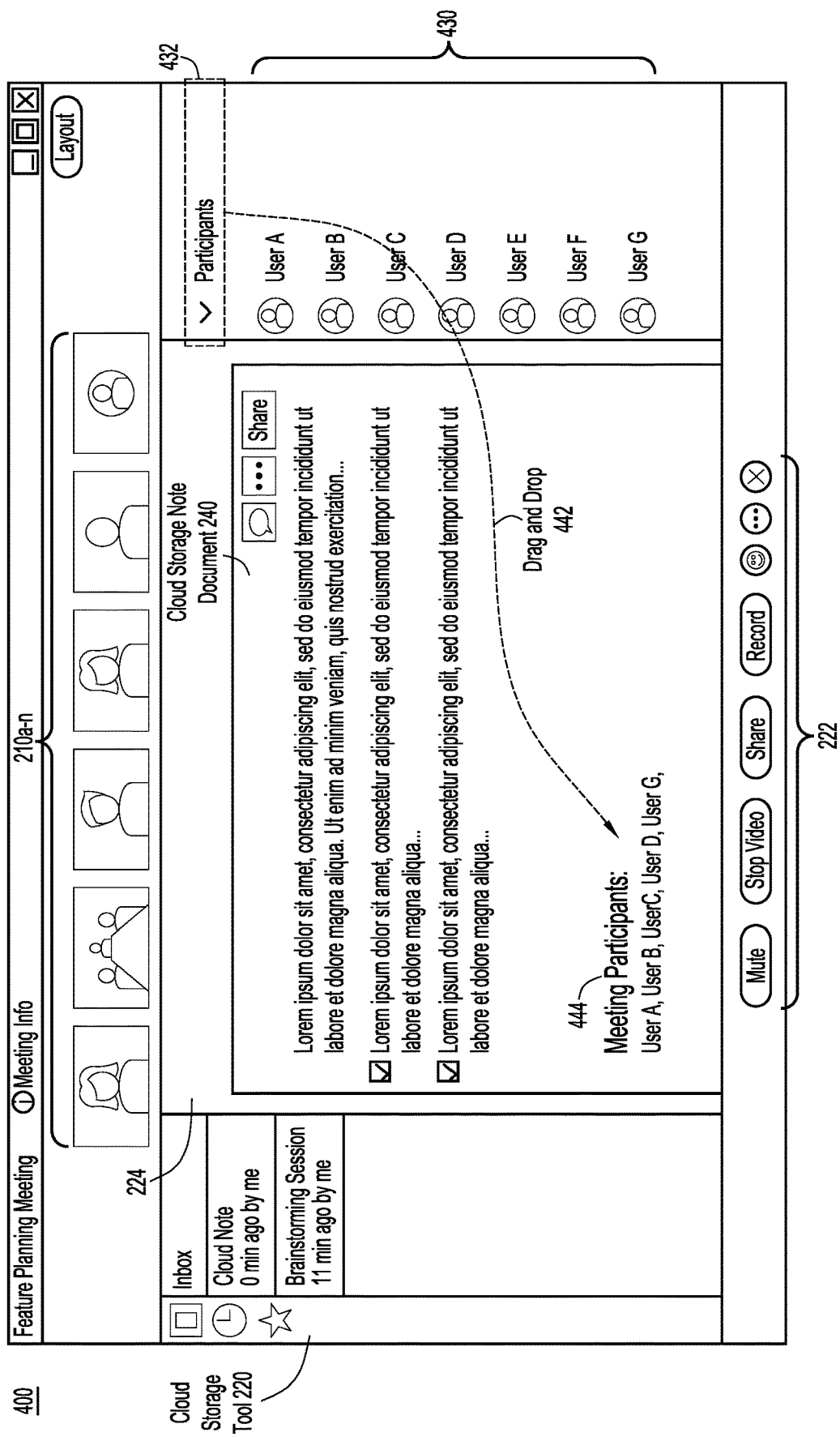
FIG. 4 is a diagram illustrating a collaboration session in which information about multiple participants is captured and embedded into a media stream associated with content of the collaboration session, according to an example embodiment.

FIG. 4 is a diagram illustrating a collaboration session 400 in which information about the participants is captured and embedded into a media stream associated with content of the collaboration session 400, according to an example embodiment.

In the collaboration session 400, a list of participants 430 is displayed instead of the meeting transcript 230, based on user selection e.g., by manipulating the control tools 222. A participant may perform a drag-and-drop action 442 in which the participant list 432 is selected and dragged and dropped into the cloud storage note document 240. Based on this drag-and-drop action 442, information about each of the participants 430 is made part of the cloud storage note document 240. Specifically, a heading "meeting participants" and a list of names 444 are made part of the cloud storage note document 240.

Figure 5:
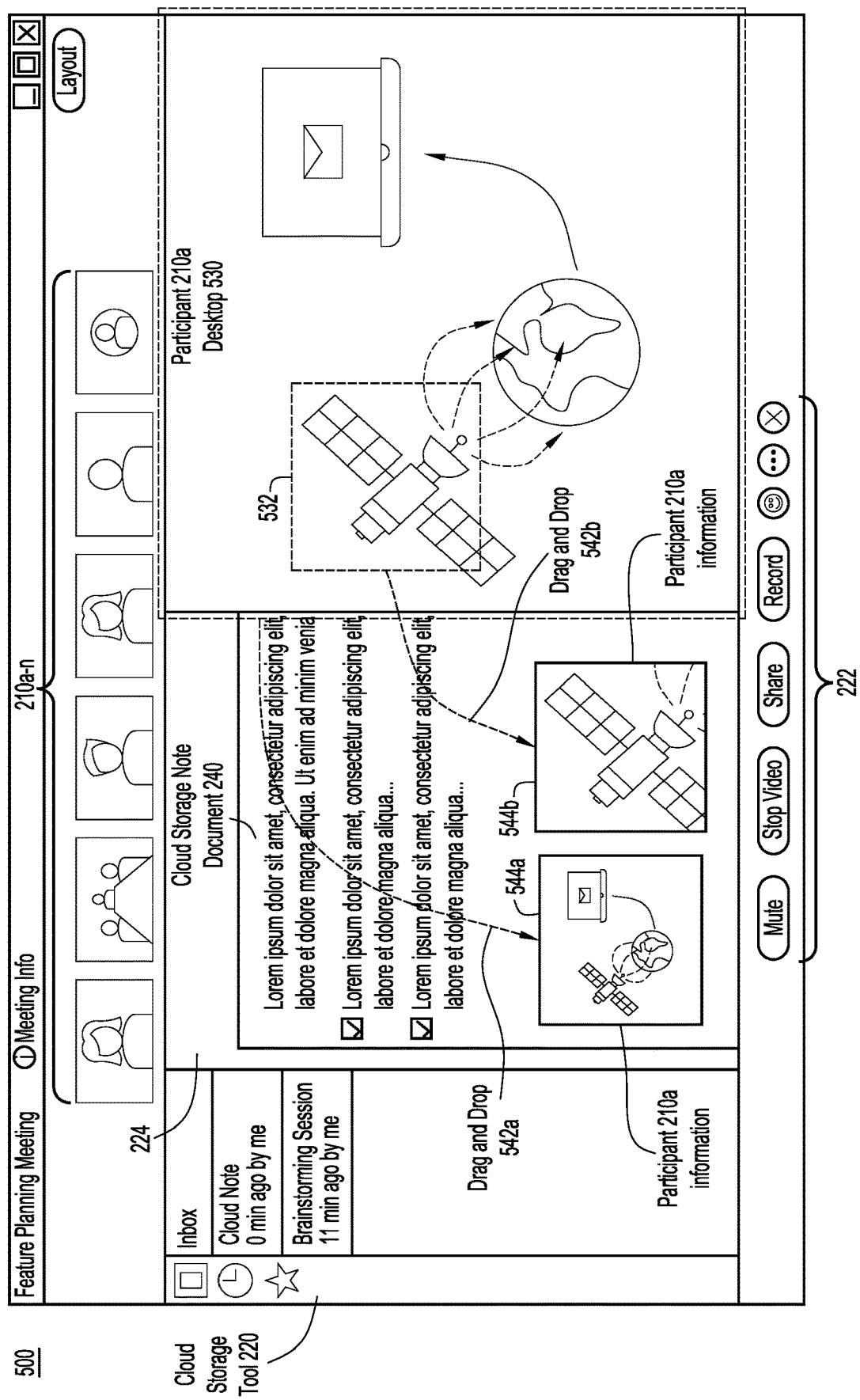
FIG. 5 is a diagram of a collaboration session in which a portion of a presenter's content is captured and embedded into a media stream associated with content of the collaboration session, according to an example embodiment.
Figure 6:
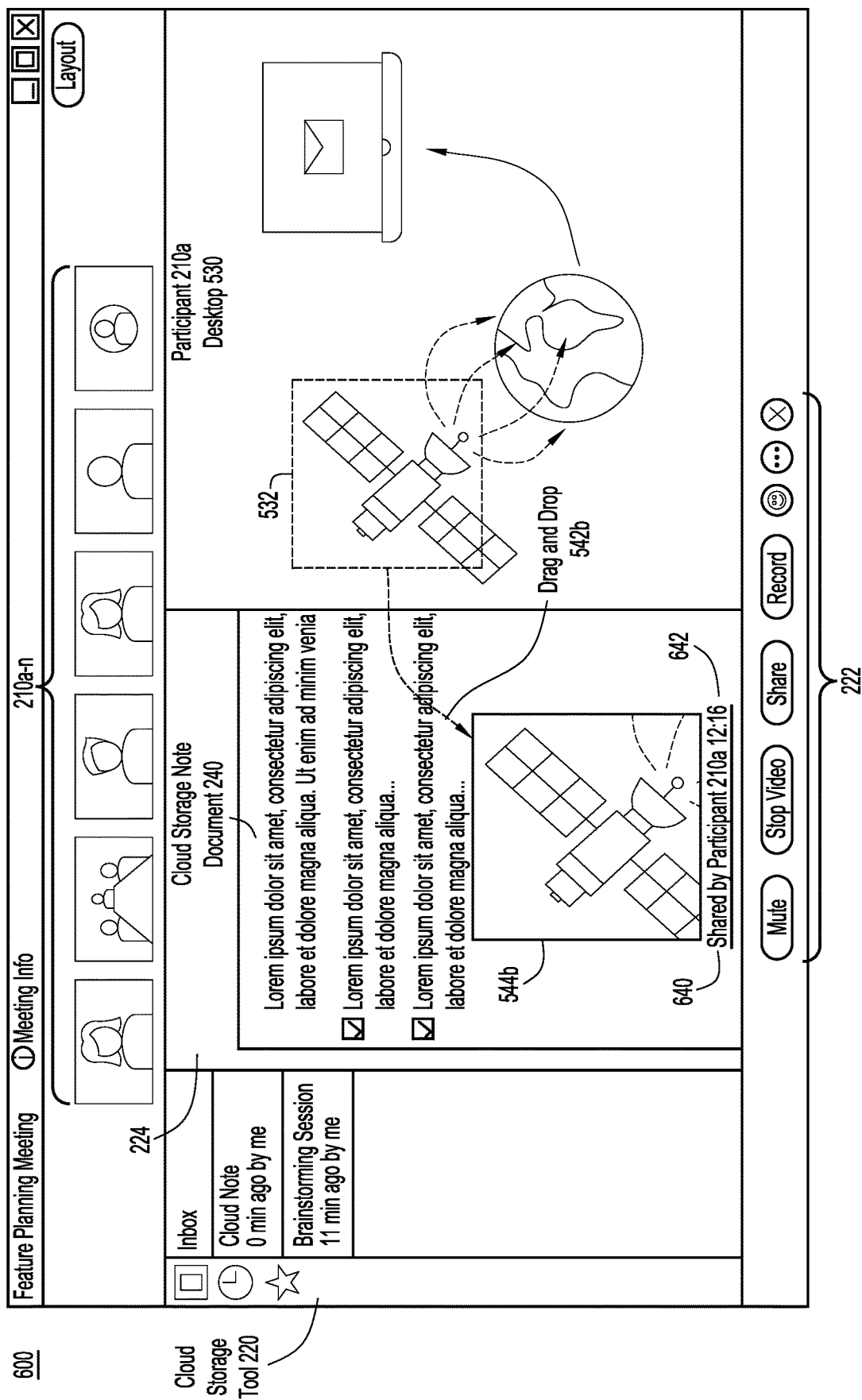
FIG. 6 is a diagram of a collaboration session in which a portion of presenter's content along with contextual information is captured and embedded, in a form of a link, into a media stream of content of the collaboration session, according to an example embodiment.

In FIGS. 5 and 6, the cloud storage note document 240 is rendered in parallel with a presenter's shared content. That is, instead of the meeting transcript 230 of FIGS. 2 and 3 or the list of participants 430 of FIG. 4, presenter's shared content is displayed.

FIG. 5 is a diagram of a collaboration session 500 in which a portion of presenter's content is captured and embedded into a media stream associated with content of the collaboration session 500, according to an example embodiment. For example, a participant 210a is the presenter and a desktop 530 of the participant 210a is shared in the collaboration session 500. Sharing the desktop 530 is one example and other content, such as a third party application(s), may be shared using an application hub, according to various use case scenarios. In the collaboration session 500, the participant 210a performs a first drag-and-drop action 542a in which a frame of the desktop 530 is captured and copied into the cloud storage note document 240, as first added content 544a. The participant 210a performs a second drag-and-drop action 542b in which a portion 532 (an image) of the desktop 530 is captured and copied into the cloud storage note document 240, as second added content 544b. The first added content 544a and the second added content 544b include information about the participant 210a such as a textual name, a frame, and/or a profile card. Information about the participant 210a is embedded into the cloud storage note document 240 as sources of the drag-and-drop actions 542a and 542b.

FIG. 6 is a diagram of a collaboration session 600 in which a portion of presenter's content along with contextual information is captured and embedded, in a form of a link, into a media stream of content of the collaboration session 600, according to an example embodiment.

In the collaboration session 600, the cloud storage note document 240 includes a link 640 to contextual information associated with the drag-and-drop action 542b. The link 640 is appended beneath the second added content 544b. The link 640 may include information about the participant 210a such as the name and a timestamp 642 (12:16) indicating time of the drag-and-drop action 542b in the collaboration session 600. Based on a selection of the link 640, a participant may be directed to a time instance in a meeting recording (a portion of the meeting transcript 230) when the drag-and-drop action 542b occurred i.e. when the portion 532 was added to the cloud storage note document 240.

The above are just some examples of various resources or metadata that may be embedded into a media stream of content of a collaboration session. In one variation, additional resources/metadata may be added such as meeting annotation, basic meeting information (such as date, time, location, subject), meeting agenda, meeting link, meeting recording link, and so on. These additional resources/metadata are added via drag-and-drop actions such as the ones described above with reference to FIGS. 2-6.

Figure 7:
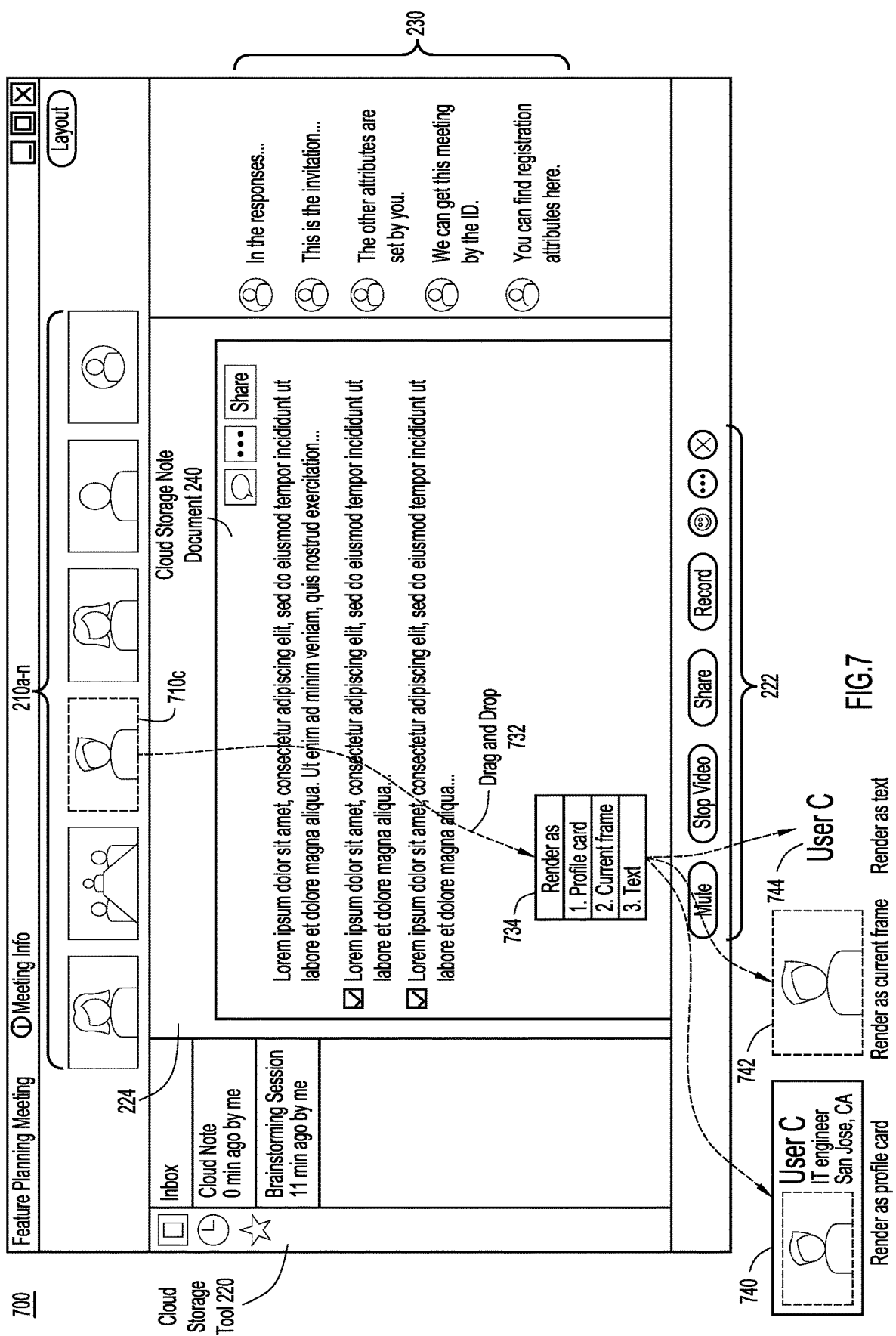
FIG. 7 is a diagram illustrating a collaboration session in which various styles of embedding metadata associated with a drag-and-drop action are provided, according to an example embodiment.

FIG. 7 is a diagram illustrating a collaboration session 700 in which various styles of embedding metadata associated with a drag-and-drop action are presented, according to an example embodiment. In the collaboration session 700, the collaboration server may provide various styles for rendering information about the participants 210a-n. That is, a prompt 734 is displayed with various style options for selection. A meeting resource 710c, such as a participant "User C," may be rendered in various styles for different purposes. When performing a drag-and-drop action 732 of the meeting resource 710c into the cloud storage note document 240, a user selection of one of the styles to render the meeting resource 710c is made using the prompt 734. The meeting resource 710c may be rendered as a profile card 740 of the participant (the meeting resource 710c), an image of a current video frame 742 of the meeting resource 710c, or a text 744 such as the name "User C" of the meeting resource 710c. These are but some examples of rendering meeting resources in various styles and are not provided by way of a limitation.

FIGS. 2-7 provide techniques of including one or more meeting resources as part of a media stream associated with content of a collaboration session to improve meeting-assisted content editing. Contextual information or metadata related to a resource, such as one or more participants that performed document-editing action, is captured with metadata such as a timestamp, a name, and/or a link to a time point in the collaboration session where the editing action occurred.

In various example embodiments, a mutual and full suite of Application Programing Interfaces (APIs)/Software Development Kits (SDKs) for online content collaboration are used to provide advanced abilities such as inserting text, images, and contextual information into the content. Some examples include:

InsertText(String text, int x, int y), where text is inserted at a location (x, y) on the whiteboard 224.

InsertImage(Image image, int x, int y), where image is inserted at the location (x, y) on the whiteboard 224.

Once a resource has been inserted into content being edited, it is fully supported in the platform (an editor) as an ordinary resource. There are no changes to user's experience.

In summary, the techniques presented above enhance handling of drag-and-drop actions by a meeting client so that sufficient meeting content is aggregated and formatted in a coherent manner by speculating user's intent according to their operations in collaboration session scenarios. With this enhanced drag-and-drop functionality, the user can easily drag-and-drop any resource or metadata of the collaboration session into content of the collaboration session, render it gracefully in the content with contextual information being embedded therein. Both user's experience and productivity are improved. In addition, capturing contextual information takes less time and is less error prone.

As explained above, during a collaboration session, a presenter may share various information with other participants using content such as various documents, slides, and so on. As the online collaboration session progresses, presenters and/or content presented may change. During a collaboration session, multiple content items by one or more participants may be sequentially rendered on a main display area of a user interface screen. If a participant joins late or misses a portion of the collaboration session, there is no easy way to obtain important information from the missed portion(s) of the collaboration session. For example, when sharing a power point file, once a presenter turns the file to the next slide, the previous content is gone. If some of the participants are interrupted by other things, or are late in joining the collaboration session, they may miss some important information. Existing solutions are insufficient for providing, to a participant, key concepts or important information of a collaboration session.

For example, a chat message function allows for all of the participants to send chat messages. As such, various useless information may flood the chat message portion of the user screen. Even if important information is included in the chat message portion, it is difficult to find because it may be buried among other chat messages. A caption and highlight function allows for highlighting or emphasizing certain words in the content of the collaboration session. However, as the content changes during the collaboration session, the emphasized words disappear. Similarly, as content changes on the whiteboard during the collaboration session, missed content or previous content disappears. Additionally, a meeting transcript cannot be obtained for the missed portions of content during the collaboration session itself and it only provides the audio portion of the content. Similarly, while notes may be made during the collaboration session, the notes of the existing solutions do not provide for content sharing, may be buried among other information, and may disappear as the collaboration session progresses.

The techniques presented below provide a meeting board section on a user interface screen in which a portion of a content item presented during the collaboration session may be captured and remain available throughout the collaboration session. The meeting board section is different from existing solutions and is the essence of the collaboration session in that it captures important information or key concepts of the collaboration session. The participants may thus easily obtain portions of the content throughout the collaboration session from start to finish. Each card on the meeting board section is a screenshot of a portion of the content (important information or key concept) provided by one or more of the presenters. In one example embodiment, only the presenters post to the meeting board section. In various example embodiments, each card on the meeting board section may be manipulated or independently manipulated by each of the participants of the collaboration session. The manipulations may include varying location and size of each of the cards on the meeting board section such as moving the card, zooming in and out, clicking to view, changes width, length and so on.

FIGS. 8-12 are diagrams illustrating various collaboration sessions in which a meeting board section is provided, by the collaboration server, to display a portion of the content such as important information or key concepts throughout the collaboration session. In FIGS. 8-12, the collaboration server provides the control tools 222, additional control tools 802, manipulation tools 804, and a user interface screen 810 throughout a collaboration session.

The collaboration server, via the additional control tools 802, provides various functionalities such as chat, annotate, share, record, view participants and so on, for the collaboration session 800. In FIGS. 8-12, instead of the participants 210a-n of FIGS. 2-7, the collaboration server provides additional control tools 802 on the user interface screen 810.

The collaboration server further provides, via the manipulation tools 804, a functionality for switching the right side of the user interface screen 810 to various different views, such as the meeting transcript 230 of FIGS. 2 and 3, a list of participants 430 of FIG. 4, content share of the presenter (the desktop 530 of FIGS. 5 and 6), and a meeting board section 830 of FIGS. 8-12. The collaboration server may distribute, to each of the participants of a collaboration session, content that includes a number of content items presented by various different participants in a main display area 820 of the user interface screen 810.

Figure 8:
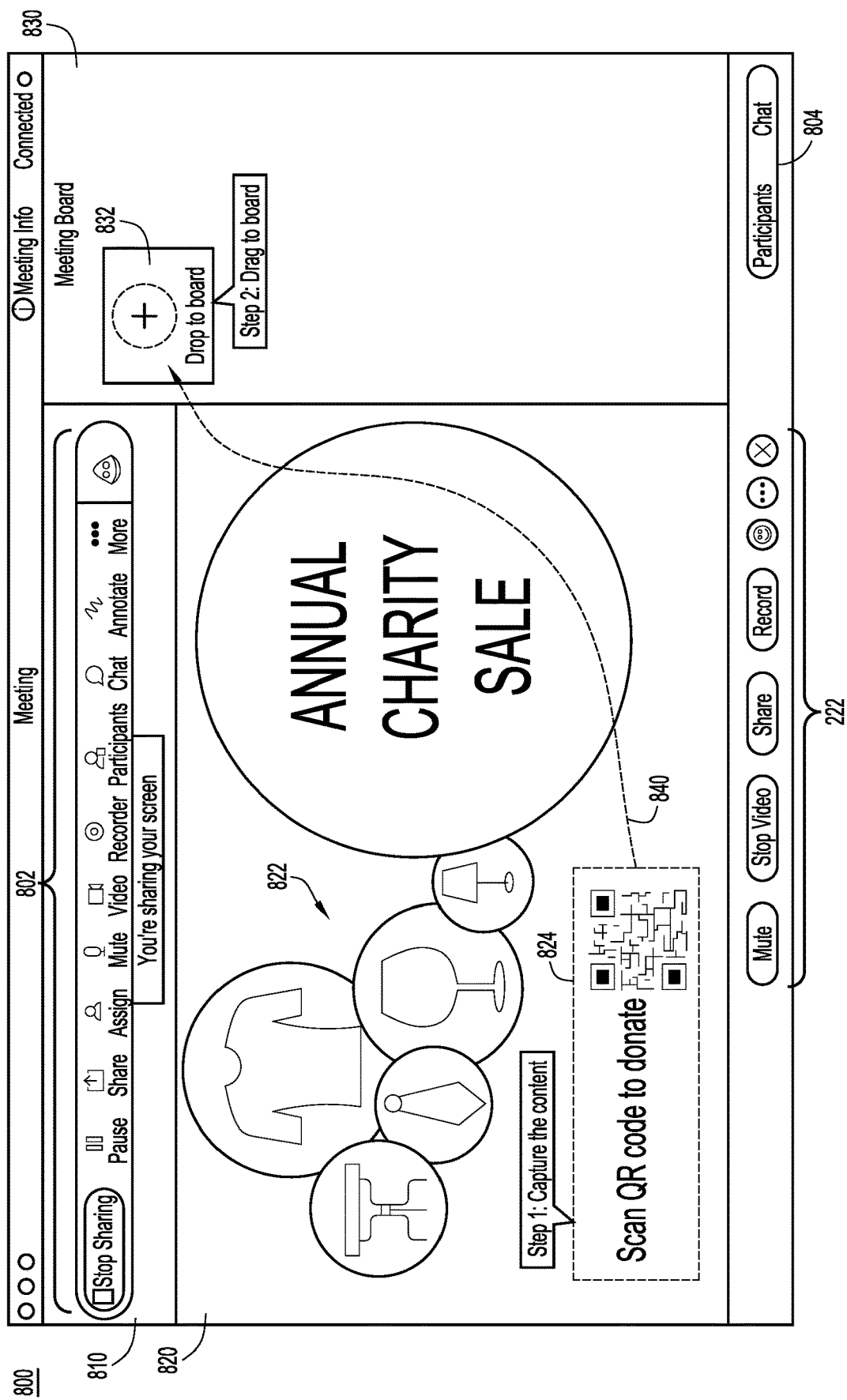
FIG. 8 is a diagram illustrating a collaboration session in which a portion of the content is copied from a main display area of a user interface screen to a meeting board section via a drag-and-drop action, according to an example embodiment.

FIG. 8 is a diagram illustrating a collaboration session 800 in which a portion of the content is copied from the main display area 820 of the user interface screen 810 to the meeting board section 830 via a drag-and-drop action, according to an example embodiment.

In the collaboration session 800, a first presenter (participant A) shares various content items in the main display area 820. For example, various goods for sale are presented in the main display area, as a first content item 822. The participant A may proceed to verbally describe each of the various goods displayed (the first content item 822). A first portion 824 of the first content item 822 in the main display area 820 may be captured by the participant A via the additional control tools 802. In this example, a QR code to purchase one of the goods is captured and/or selected by the participant A.

Figure 9:
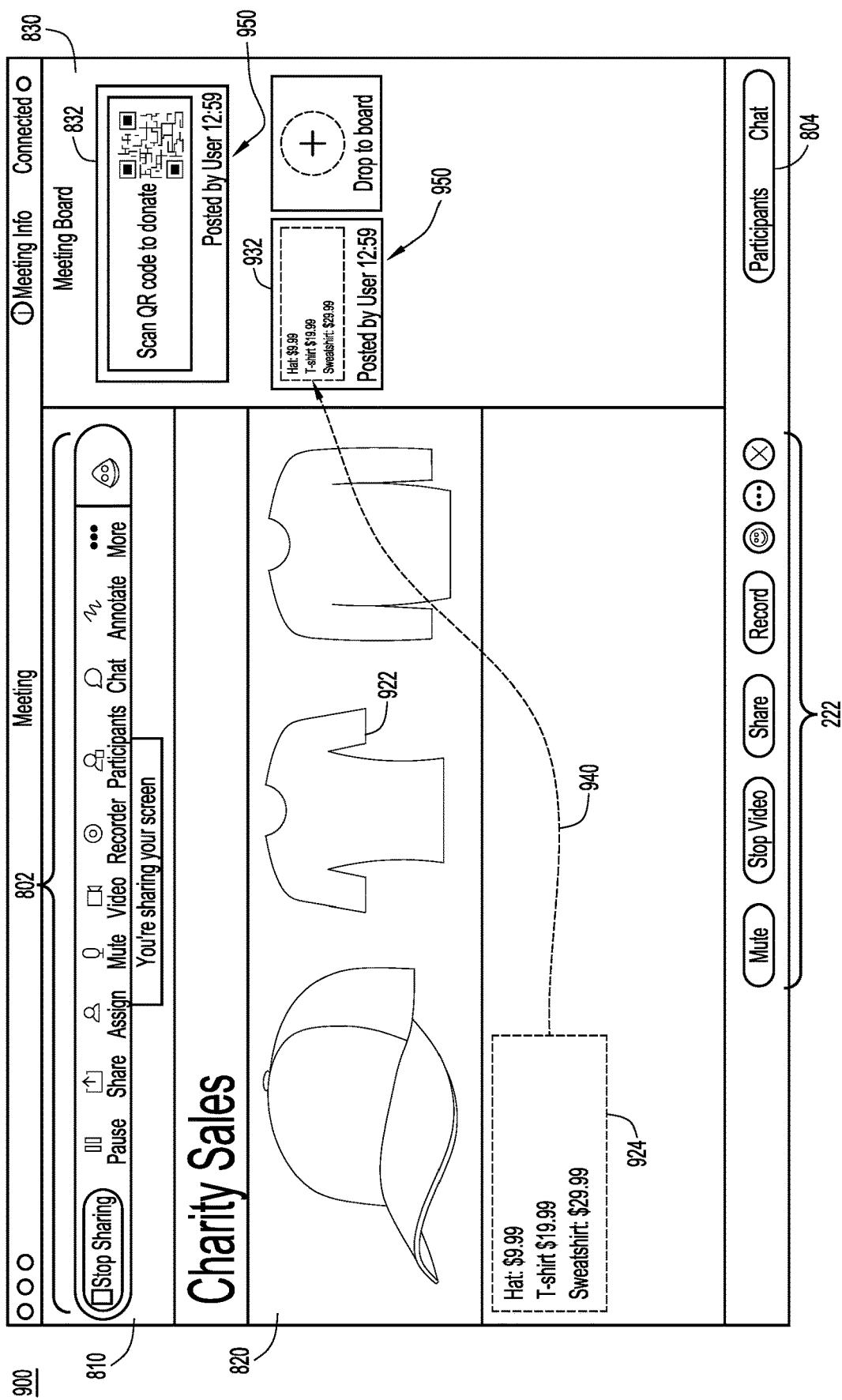
FIG. 9 is a diagram illustrating a collaboration session in which another portion of another content item is copied from the main display area of the user interface screen to the meeting board section via a drag-and-drop action, according to an example embodiment.

The participant A then performs a drag-and-drop action 840 to copy the first portion 824 to the meeting board section 830 of the user interface screen 810. The first portion 824 is posted in the meeting board section 830 even after the shared content changes, as shown in FIG. 9. That is, the collaboration server generates a first card 832 for displaying the first portion 824 in the meeting board section 830 throughout the collaboration session 800.

FIG. 9 is illustrates a collaboration session 900 in which another portion of another content item is copied from the main display area 820 of the user interface screen 810 onto the meeting board section 830 via a drag-and-drop action, according to an example embodiment.

In the collaboration session 900, the participant A presents a second content item 922 in the main display area 820 of the user interface screen 810. Even though the participant A moved to the second content item 922, such as the next slide, the meeting board section 830 displays the first card 832 that includes the first portion 824. In the collaboration session 900, the participant A selects a second portion 924 of the second content item 922, such as the price of the second content item 922 and copies it to the meeting board section 830 via a drag-and-drop action 940. Based on the drag-and-drop action 940, the collaboration server generates a second card 932 that includes the second portion 924 (price information).

In FIGS. 8 and 9, once the presenter A starts to share various content (the first content item 822, the second content item 922, . . . and nth content item), the meeting board section 830 remains on the user interface screen 810 throughout a collaboration session until the collaboration session is completed. Accordingly, important information and/or key concepts are easily accessible by the participants even when one or more portions of the collaboration session are missed.

The collaboration server further captures contextual information (a source or a resource of FIGS. 2-7) associated with each of the drag-and-drop actions and renders it with the respective card in the meeting board section 830. For example, the first card 832 and the second card 932 include information about the participant A i.e., the metadata 950, associated with the drag-and-drop actions 840 and 940, respectively. The metadata 950 includes the name of the participant A "User" and a timestamp of the respective drag-and-drop action. In one example embodiment, a link of FIG. 6 may be provided to allow a participant to jump to a frame and/or a point in the meeting transcript associated with the respective drag-and-drop action and/or the respective content item. In another example embodiment, the metadata may be rendered in various styles of FIG. 7, based on user selection.

Even when sharing of various content is completed, the collaboration server still provides the meeting board section 830 on the user interface screen 810 to show various key concepts or information of the collaboration session, in a form of various cards. Cards are just one example of rendering portions of the content to the meeting board section 830. The form or format in which the portions are rendered to the meeting board section 830 depends on a particular implementation and use case scenario.

Figure 10:
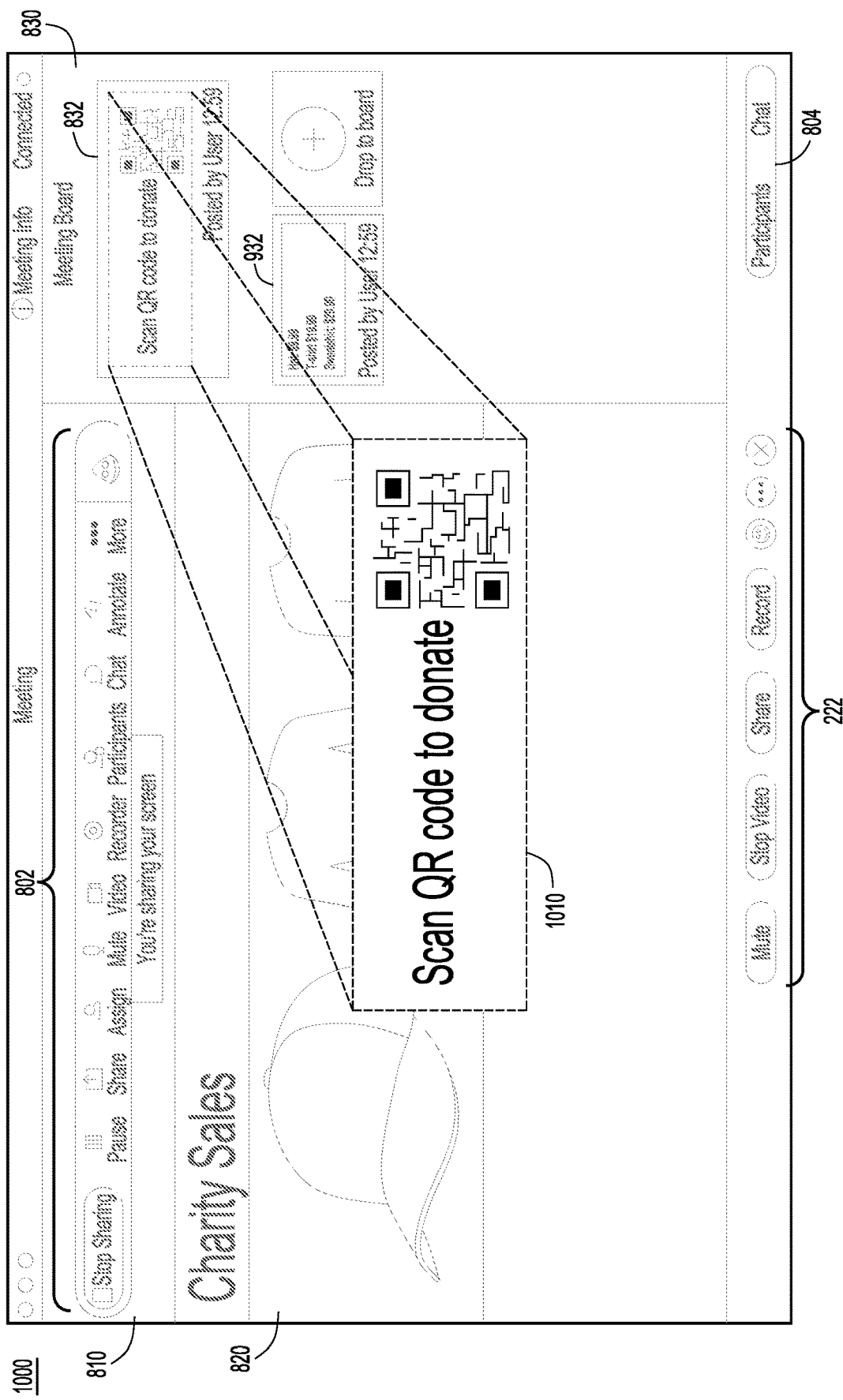
FIG. 10 is a diagram illustrating a collaboration session in which one or more cards in a meeting board section of a user interface screen is changed in size and/or location, according to an example embodiment.

FIG. 10 is a diagram illustrating a collaboration session 1000 in which one or more cards in a meeting board section of a user interface screen is changed in size and/or location, according to an example embodiment. In the collaboration session 1000, the collaboration server is configured to manipulate size and/or location of the generated cards in the meeting board section 830 of the user interface screen 810 according to user selection. For example, the first card 832 is zoomed-in (enlarged) 1010 and presented in the middle of the user interface screen 810 based on user selection e.g., via a click of a mouse.

Optionally, the user interface screen 810 may be greyed-out to focus the participant's attention to the selected first card 832 presented in an enlarged size in a middle of the user interface screen 810. In one example embodiment, the collaboration server is configured to generate the cards in different default sizes based on a portion of the content being dragged and dropped. The collaboration server may place the cards sequentially in the meeting board section 830. The collaboration server may further be configured to rearrange the cards (size and/or location) in the meeting board section 830 based on user input.

Figure 11:
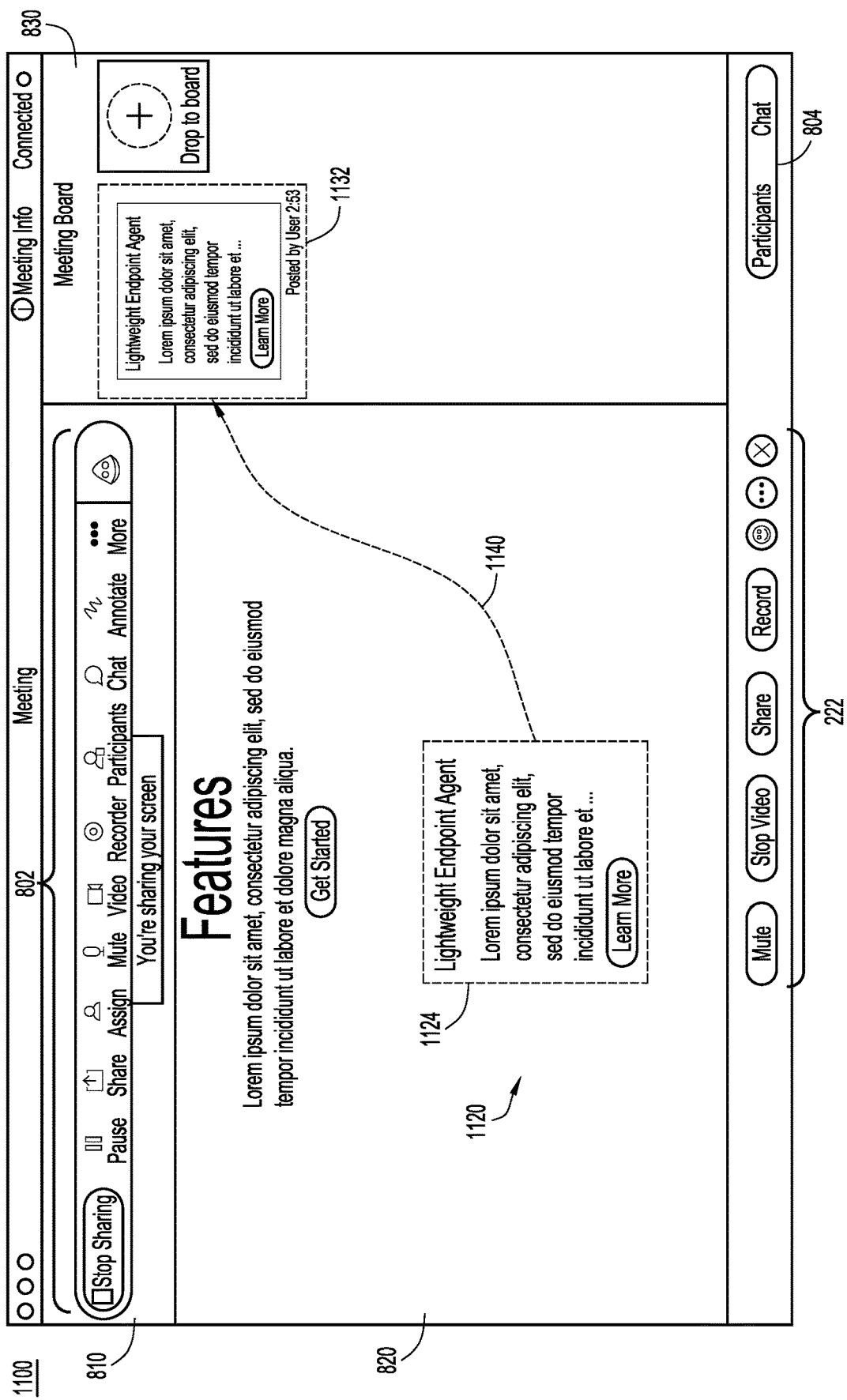
FIGS. 11 and 12 are diagrams illustrating a collaboration session in which there are various presenters that sequentially change content, and cards in the meeting board section are generated based on drag-and-drop actions of these various presenters, according to an example embodiment.
Figure 12:
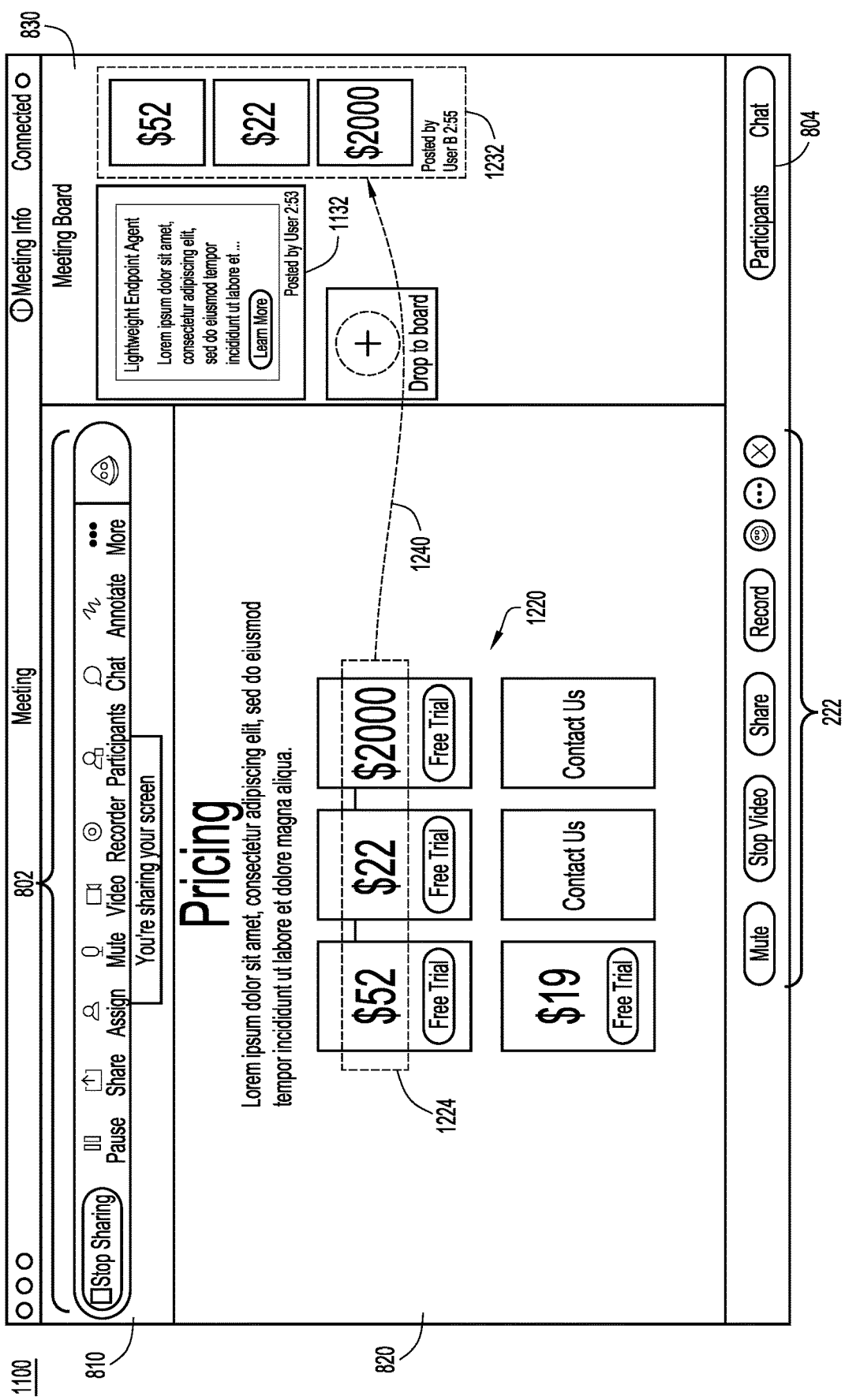

FIGS. 11 and 12 are diagrams illustrating a collaboration session 1100 in which there are several different presenters that sequentially change content, and cards in the meeting board section are generated based on drag-and-drop actions of these various presenters, according to an example embodiment.

In FIG. 11, the collaboration server renders the collaboration session 1100 in which the first presenter "User" completed his presentation with a first content item 1120 (last content item in his presentation). While the first presenter is changed to the second presenter of FIG. 12, the first present can still select a first portion 1124 of the first content item 1120 displayed in the main display area 820 that may or may not be shared at this point with the rest of the participants of the collaboration session 1100. The collaboration server then detects a drag-and-drop action 1140, from the first presenter. Based on the detected drag-and-drop action 1140, the collaboration server copies the first portion 1124 to the meeting board section 830. The collaboration server generates a first card 1132 for the first portion 1124 and renders the first card 1132 in the meeting board section 830.

Meanwhile, the collaboration session continues with the second presenter "User B" presenting his content items. In FIG. 12, the collaboration server renders the collaboration session 1100 in which the second presenter begins his presentation with a second content item 1220 (first content item in his presentation). The collaboration server detects a selection of a second portion 1224 of the second content item 1220 and a drag-and-drop action 1240 onto the meeting board section 830. Based on the detected drag-and-drop action 1240, the collaboration server generates a second card 1232, which includes the second portion 1224. The meeting board section 830 includes cards from various different presenters of the collaboration session 1100.

In one example embodiment, even when no content is displayed in the main display area 820 of the user interface screen 810, the collaboration server still renders the meeting board section 830.

In summary, the meeting board section 830 provides an area on a user interface screen in which portions of the content such as important information and/or key concepts along with source of the data may be displayed throughout the collaboration session. As a result, the participants can view key points at any time throughout the collaboration session even if various portions of the collaboration session are missed.

Figure 13:
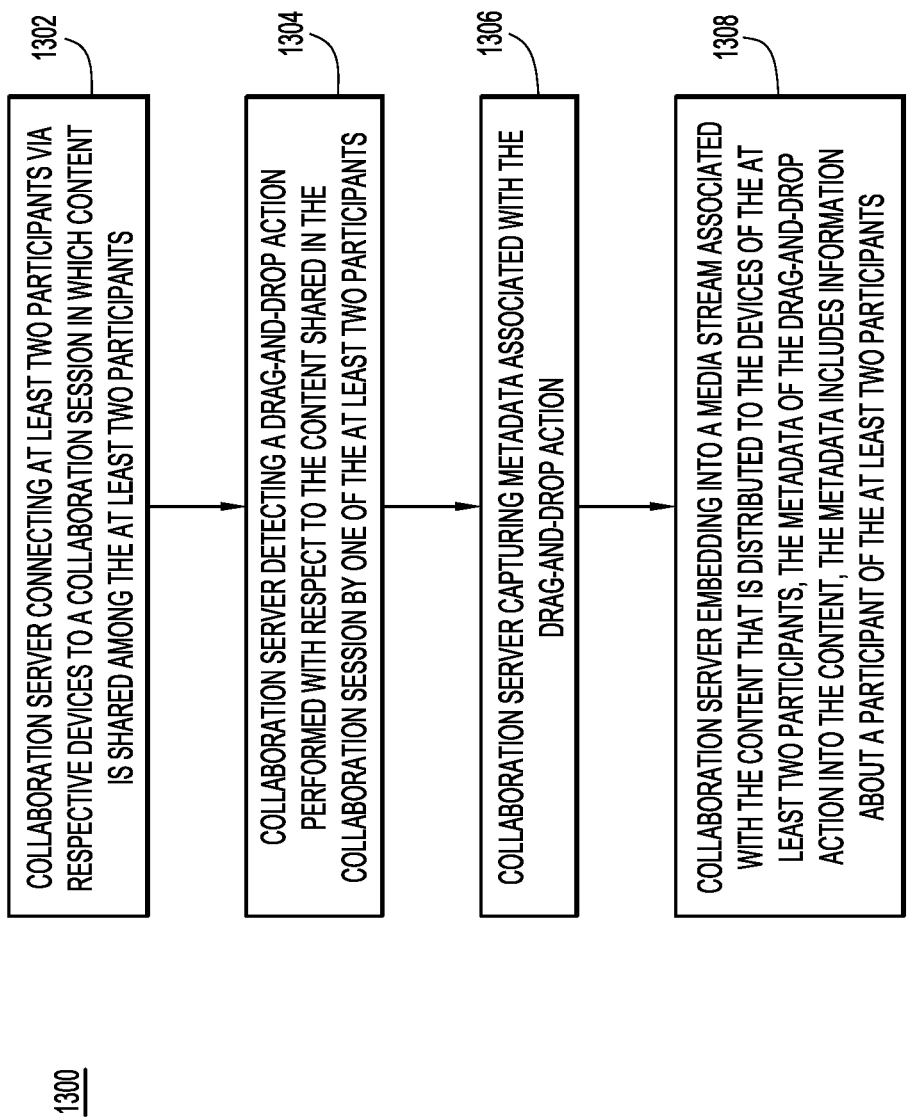
FIG. 13 is a flow chart illustrating a method of embedding metadata of the drag-and-drop action into content of a collaboration session, according to an example embodiment.

Reference is now made to FIG. 13, which is a flow diagram illustrating a method 1300 of embedding metadata of the drag-and-drop action into content of a collaboration session, according to an example embodiment. The method 1300 may be implemented by a collaboration server such as one of the collaboration servers 120a-n of FIG. 1.

At 1302, the method 1300 involves a collaboration server connecting at least two participants via respective devices to a collaboration session in which content is shared among the at least two participants.

At 1304, the method 1300 involves the collaboration server detecting a drag-and-drop action performed with respect to the content shared in the collaboration session by one of the at least two participants.

At 1306, the method 1300 involves the collaboration server capturing metadata associated with the drag-and-drop action.

At 1308, the method 1300 involves the collaboration server embedding, into a media stream associated with the content that is distributed to the respective devices of the at least two participants, the metadata of the drag-and-drop action into the content. The metadata includes information about a participant of the at least two participants.

In the method 1300, the metadata may include at least one of a profile card of the participant, a current frame of the participant, or textual identification information of the participant.

According to one or more example embodiments, the operation 1308 of embedding the metadata may include embedding the metadata representing at least one of a profile card of the participant, a current frame of the participant, or textual identification information of the participant, according to a selection, by one of the at least two participants, of one of a plurality of presented style options.

In one form, the drag-and-drop action may include a portion of a meeting transcript of the collaboration session being added to the content of the collaboration session. The operation 1308 of embedding the metadata may include embedding, into the content of the collaborative session, information of each participant identified in the portion of the meeting transcript.

In another form, the drag-and-drop action may include adding a frame of one or more participants of the at least two participants into the content. The operation 1308 of embedding the metadata may include embedding, into the content of the collaboration session, a profile card that includes name and contact information for each of the one or more participants.

According to one or more example embodiments, the drag-and-drop action may include dragging a participants field into the content. The operation 1308 of embedding the metadata may include embedding, into the content of the collaboration session, information for each of the at least two participants of the collaboration session.

In one instance, the drag-and-drop action may include adding at least a portion of another application content into the content of the collaboration session. The operation 1308 of embedding the metadata may include embedding, into the content of the collaboration session, a link to the metadata of the drag-and-drop action. The metadata may further include a timestamp to a corresponding portion of the media stream of the collaboration session and the information about the participant that initiated the drag-and-drop action.

[ow] In the method 1300, the content of the collaboration session may be presented in a main content area of a user interface screen that also includes a meeting board section. The drag-and-drop action may include adding a portion of the content displayed in the main content area to the meeting board section such that the meeting board section including the portion is displayed throughout the collaboration session while the content in the main content area changes throughout the collaboration session, wherein the participant initiated the drag-and-drop action.

Figure 14:
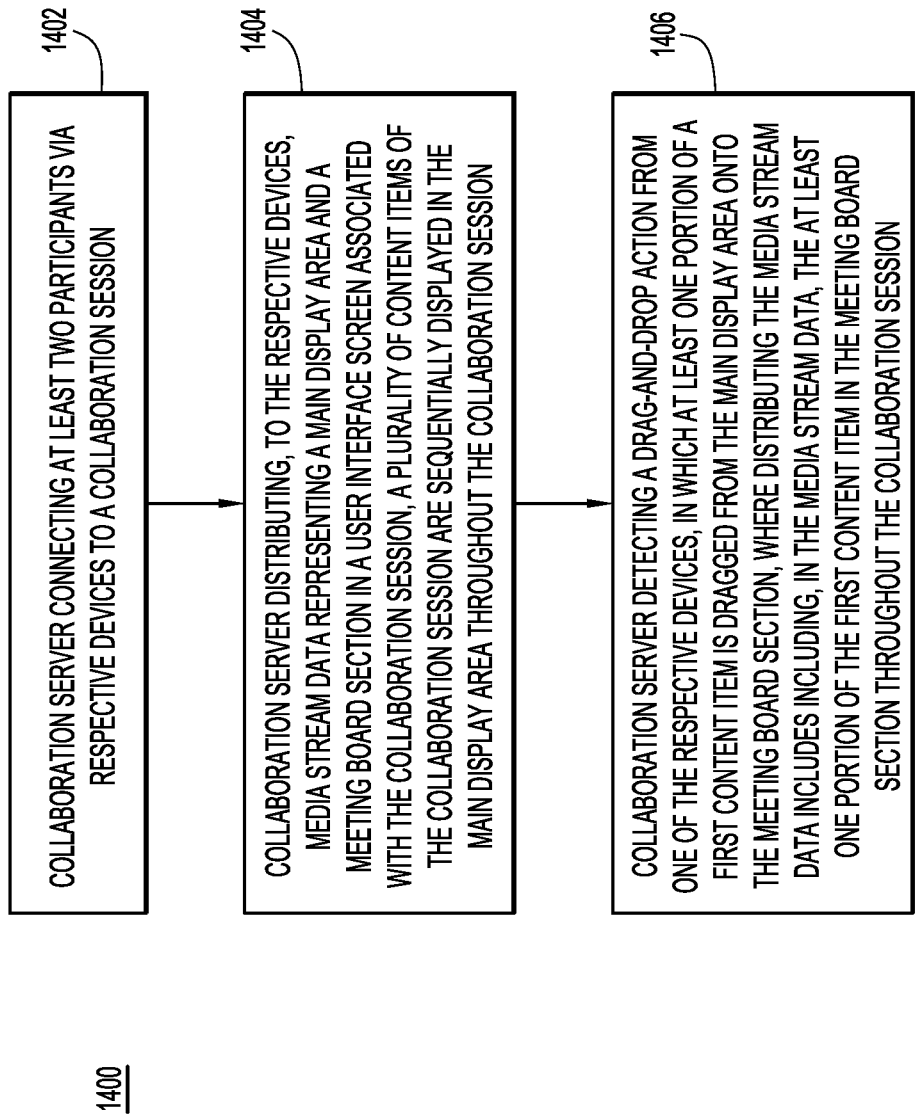
FIG. 14 is a flow chart illustrating a method of distributing media stream data of a collaboration session in which at least a portion of a first content item is included on a meeting board section of a user interface screen throughout the collaboration session, according to an example embodiment.

FIG. 14 is a flow diagram illustrating a method 1400 of distributing media stream data of a collaboration session in which at least a portion of a first content item is included on a meeting board section of a user interface screen throughout the collaboration session, according to an example embodiment. The method 1400 may be implemented by a collaboration server such as one of the collaboration servers 120*a*-*n* of FIG. 1.

At 1402, the method 1400 involves a collaboration server connecting at least two participants via respective devices to a collaboration session.

At 1404, the method 1400 involves the collaboration server distributing, to the respective devices, media stream data representing a main display area and a meeting board section in a user interface screen associated with the collaboration session. A plurality of content items of the collaboration session are sequentially displayed in the main display area throughout the collaboration session.

At 1406, the method 1400 involves the collaboration server detecting a drag-and-drop action from one of the respective devices, in which at least one portion of a first content item is dragged from the main display area onto the meeting board section.

The operation 1404 of distributing the media stream data involves including, in the media stream data, the at least one portion of the first content item in the meeting board section throughout the collaboration session.

In the method 1400, the operation 1406 of detecting the drag-and-drop action may include detecting a first drag-and-drop action from a first device of the respective devices in which the at least one portion is selected from the first content item in the main display area and detecting a second drag-and-drop action from a second device of the respective devices in which a second content portion is selected from a second content item in the main display area. The second content item is rendered in the main display area after the first content item.

In one form, the method 1400 may further involve based on detecting the drag-and-drop action, capturing metadata of the drag-and-drop action. The media stream data may include the at least one portion of the first content item together with the metadata in the meeting board section throughout the collaboration session. The metadata includes one or more of information about one of the at least two participants that initiated the drag-and-drop action and a timestamp of the drag-and-drop action.

In another form, the method 1400 may further involve manipulating at least one of size and location of the at least one portion of the first content item in the meeting board section in response to input from one of the at least two participants.

According to one or more example embodiments, the operation 1404 of distributing the media stream data may include distributing a first content portion of the first content item among the plurality of content items in the meeting board section while the main display area displays one or more content items among the plurality of content items other than the first content item. The first content portion is a key concept of the first content item.

In one instance, the media stream data may include a first content portion of the first content item among the plurality of content items in the meeting board section while none of the plurality of content items are displayed the main display area.

Figure 15:
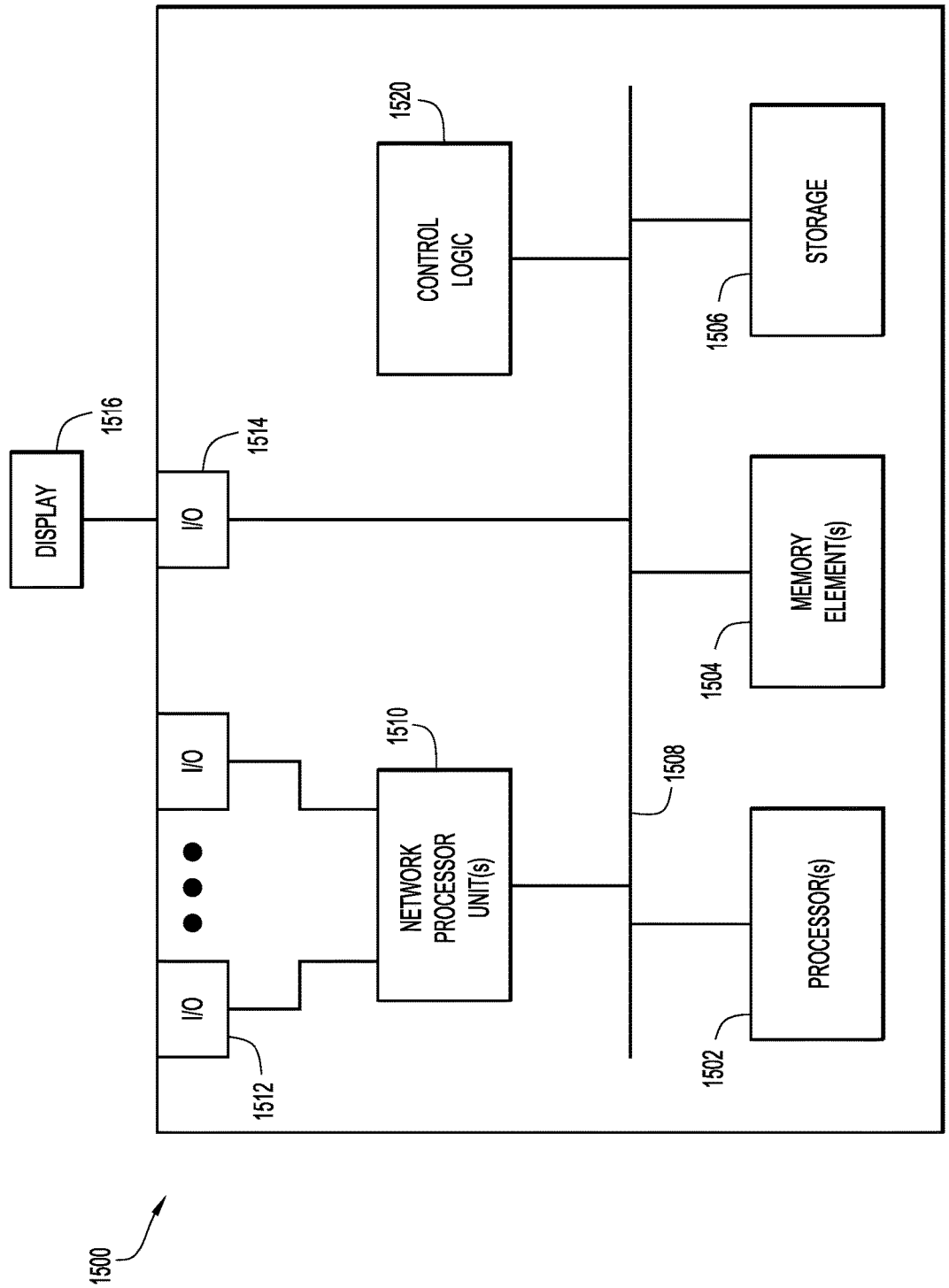
FIG. 15 is a hardware block diagram of a computing device that may perform one or more techniques depicted in FIGS. 1-14.

FIG. 15 is a hardware block diagram of a computing device 1500 that may perform functions associated with any combination of operations in connection with the techniques depicted in FIGS. 1-14, according to various example embodiments, including, but not limited to, operations of the collaboration server of the collaboration servers 120*a*-*n* of FIG. 1. It should be appreciated that FIG. 15 provides only an illustration of one embodiment and does not imply any limitations with regard to the environments in which different embodiments may be implemented. Many modifications to the depicted environment may be made.

In at least one embodiment, computing device 1500 may include one or more processor(s) 1502, one or more memory element(s) 1504, storage 1506, a bus 1508, one or more network processor unit(s) 1510 interconnected with one or more network input/output (I/O) interface(s) 1512, one or more I/O interface(s) 1514, and control logic 1520. In various embodiments, instructions associated with logic for computing device 1500 can overlap in any manner and are not limited to the specific allocation of instructions and/or operations described herein.

In at least one embodiment, processor(s) 1502 is/are at least one hardware processor configured to execute various tasks, operations and/or functions for computing device 1500 as described herein according to software and/or instructions configured for computing device 1500. Processor(s) 1502 (e.g., a hardware processor) can execute any type of instructions associated with data to achieve the operations detailed herein. In one example, processor(s) 1502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1504 and/or storage 1506 is/are configured to store data, information, software, and/or instructions associated with computing device 1500, and/or logic configured for memory element(s) 1504 and/or storage 1506. For example, any logic described herein (e.g., control logic 1520) can, in various embodiments, be stored for computing device 1500 using any combination of memory element(s) 1504 and/or storage 1506. Note that in some embodiments, storage 1506 can be consolidated with one or more memory elements 1504 (or vice versa), or can overlap/exist in any other suitable manner.

In at least one embodiment, bus 1508 can be configured as an interface that enables one or more elements of computing device 1500 to communicate in order to exchange information and/or data. Bus 1508 can be implemented with any architecture designed for passing control, data and/or information between processors, memory elements/storage, peripheral devices, and/or any other hardware and/or software components that may be configured for computing device 1500. In at least one embodiment, bus 1508 may be implemented as a fast kernel-hosted interconnect, potentially using shared memory between processes (e.g., logic), which can enable efficient communication paths between the processes.

In various embodiments, network processor unit(s) 1510 may enable communication between computing device 1500 and other systems, entities, etc., via network I/O interface(s) 1512 to facilitate operations discussed for various embodiments described herein. In various embodiments, network processor unit(s) 1510 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1500 and other systems, entities, etc. to facilitate operations for various embodiments described herein. In various embodiments, network I/O interface(s) 1512 can be configured as one or more Ethernet port(s), Fibre Channel ports, and/or any other I/O port(s) now known or hereafter developed. Thus, the network processor unit(s) 1510 and/or network I/O interface(s) 1512 may include suitable interfaces for receiving, transmitting, and/or otherwise communicating data and/or information in a network environment.

I/O interface(s) 1514 allow for input and output of data and/or information with other entities that may be connected to computer device 1500. For example, I/O interface(s) 1514 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 1516.

In various embodiments, control logic 1520 can include instructions that, when executed, cause processor(s) 1502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In one example embodiment, an apparatus is provided to perform the above-described functions of one of the collaboration servers 120a-n of FIG. 1. The apparatus includes a memory, a network interface configured to enable network communications and a processor. The processor is configured to perform various operations. The operations include connecting at least two participants via respective devices to a collaboration session in which content is shared among the at least two participants and detecting a drag-and-drop action performed with respect to the content shared in the collaboration session by one of the at least two participants. The operations further include capturing metadata associated with the drag-and-drop action and embedding, into a media stream associated with the content that is distributed to the respective devices of the at least two participants, the metadata of the drag-and-drop action into the content. The metadata includes information about a participant of the at least two participants.

In another example embodiment, an apparatus is provided to perform the above-described functions of one of the collaboration servers 120a-n of FIG. 1. The apparatus includes a memory, a network interface configured to enable network communications and a processor. The processor is configured to perform various operations. The operations include connecting at least two participants via respective devices to a collaboration session and distributing, to the respective devices, media stream data representing a main display area and a meeting board section in a user interface screen associated with the collaboration session. A plurality of content items of the collaboration session are sequentially displayed in the main display area throughout the collaboration session. The operations further include detecting a drag-and-drop action from one of the respective devices, in which at least one portion of a first content item is dragged from the main display area onto the meeting board section. The operation of distributing the media stream data involves including, in the media stream data, the at least one portion of the first content item in the meeting board section throughout the collaboration session.

In yet another example embodiment, one or more non-transitory computer readable storage media encoded with instructions are provided. When the media is executed by a processor, the instructions cause the processor to execute operations explained above with reference to FIGS. 1-15.

In yet another example embodiment, a system is provided that includes the devices and operations explained above with reference to FIGS. 1-15.

The programs described herein (e.g., control logic 1520) may be identified based upon the application(s) for which they are implemented in a specific embodiment. One example of the control logic 1520 is a collaboration service of FIGS. 1-14. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1506 and/or memory elements(s) 1504 can store data, software, code, instructions (e.g., processor instructions), logic, parameters, combinations thereof, and/or the like used for operations described herein. This includes the storage 1506 and/or memory elements(s) 1504 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    connecting, by a collaboration server, at least two participants via respective devices to a collaboration session in which content is shared among the at least two participants;
    detecting, by the collaboration server, a drag-and-drop action performed with respect to the content shared in the collaboration session by one of the at least two participants;
    capturing, by the collaboration server, corresponding metadata of the drag-and-drop action, wherein the corresponding metadata includes one or more sources that contributed to modifying the content of the collaboration session using the drag-and-drop action; and
    embedding, by the collaboration server, into a media stream associated with the content that is distributed to the respective devices of the at least two participants, the corresponding metadata of the drag-and-drop action into the content, wherein the one or more sources include information about a participant of the at least two participants, wherein embedding the corresponding metadata includes:
        presenting a plurality of style options in which to render the information about the participant, wherein the plurality of style options include a profile card style, a current participant frame style, or a textual style that includes textual identification information of the participant,
        obtaining a selection of one of the plurality of style options, and
        embedding the corresponding metadata, according to the selection, by one of the at least two participants.

2. The method of claim 1, wherein the drag-and-drop action includes adding a frame of one or more participants of the at least two participants into the content.

3. The method of claim 1, wherein the drag-and-drop action includes dragging a participants field rendered in the collaboration session into the content, and embedding the corresponding metadata includes:
    embedding, into the content of the collaboration session, the information for each of the at least two participants of the collaboration session.

4. The method of claim 1, wherein the drag-and-drop action includes adding at least a portion of another application content into the content of the collaboration session, and wherein the corresponding metadata further includes a timestamp to a corresponding portion of the media stream of the collaboration session.

5. The method of claim 1, wherein the content of the collaboration session is presented in a main content area of a user interface screen that includes a meeting board section, and
    wherein the drag-and-drop action includes adding a portion of the content displayed in the main content area to the meeting board section such that the meeting board section including the portion is displayed throughout the collaboration session while the content in the main content area changes throughout the collaboration session, wherein the participant initiated the drag-and-drop action.

6. The method of claim 1, wherein the collaboration session is a video conference and detecting the drag-and-drop action includes detecting that the one of the at least two participants selected a participant list field rendered during the video conference and drag-and-dropped the participant list field into the content shared during the video conference.

7. A method comprising:
    connecting, by a collaboration server, at least two participants via respective devices to a collaboration session in which content is shared among the at least two participants;
    generating a textual meeting transcript that is transcribed from an audio stream of the collaboration session;
    detecting, by the collaboration server, a drag-and-drop action performed by one of the at least two participants with respect to at least a portion of the textual meeting transcript;
    capturing, by the collaboration server, corresponding metadata of the portion of the textual meeting transcript, wherein the corresponding metadata includes information about each participant that participated in the audio stream transcribed in the portion of the textual meeting transcript that is being drag-and-dropped into the content; and
    embedding, by the collaboration server, into a media stream associated with the content that is distributed to the respective devices of the at least two participants, the portion of the textual meeting transcript along with the information about each participant that participated in the audio stream transcribed in the portion of the textual meeting transcript.

8. The method of claim 7, wherein the portion of the textual meeting transcript includes a first part that represents a first audio of a first participant of the at least two participants and a second part that represents a second audio of a second participant of the at least two participants that participated in the audio stream transcribed in the portion of the textual meeting transcript.

9. The method of claim 8, wherein the information about the first participant and the second participant is embedded in a form of an actionable link.

10. The method of claim 7, further comprising:
    embedding, into the content of the collaboration session, metadata about the one of the at least two participants that performed the drag-and-drop action.

11. The method of claim 7, wherein the information about each participant is embedded into the media stream in a form of at least one of:
    a profile card of a respective participant,
    a current frame of the respective participant, or
    textual identification information of the respective participant.

12. A method comprising:
connecting, by a collaboration server, at least two participants via respective devices to a collaboration session;
distributing, by the collaboration server to the respective devices, media stream data representing a main display area and a meeting board section in a user interface screen associated with the collaboration session, wherein a plurality of content items of the collaboration session are sequentially displayed in the main display area throughout the collaboration session;
detecting, by the collaboration server, a drag-and-drop action from one of the respective devices, in which at least one portion of a first content item is captured and dragged from the main display area onto the meeting board section; and
generating an object for the meeting board section, wherein the object represents the at least one portion of the first content item that was captured and dragged onto the meeting board section and the object is independently manipulatable by each of the at least two participants including positioning the object to a front of a user interface by displaying, based on a selection by one of the at least two participants, the object in different size and at least partially outside the meeting board section,
wherein distributing the media stream data includes including, in the media stream data, the object in the meeting board section throughout the collaboration session while changing the main display area by replacing rendering of the first content item with a subsequent content item of the plurality of content items.

13. The method of claim 12, wherein detecting the drag-and-drop action includes:
detecting a first drag-and-drop action from a first device of the respective devices in which the at least one portion is selected from the first content item in the main display area; and
detecting a second drag-and-drop action from a second device of the respective devices in which a second content portion is selected from a second content item in the main display area, wherein the second content item is rendered in the main display area after the first content item is no longer rendered in the main display area.

14. The method of claim 12, further comprising:
based on detecting the drag-and-drop action, capturing metadata of the drag-and-drop action,
wherein the media stream data includes the object together with the metadata in the meeting board section throughout the collaboration session, and
wherein the metadata includes one or more of information about one of the at least two participants that initiated the drag-and-drop action and a timestamp of the drag-and-drop action.

15. The method of claim 12, further comprising:
manipulating at least one of the size of the object and a location of the object in the meeting board section in response to input from one of the at least two participants.

16. The method of claim 12, wherein distributing the media stream data includes distributing the object in the meeting board section while the main display area displays one or more content items among the plurality of content items other than the first content item and the object represents a key concept of the first content item.

17. The method of claim 12, wherein the media stream data includes a first content portion of the first content item among the plurality of content items in the meeting board section while none of the plurality of content items are displayed the main display area.

18. The method of claim 9, wherein positioning the object to the front of the user interface includes displaying the object outside the meeting board section.

19. An apparatus comprising:
a memory;
a network interface configured to enable network communications; and
a processor, wherein the processor is configured to perform operations comprising:
connecting at least two participants via respective devices to a collaboration session in which content is shared among the at least two participants;
detecting a drag-and-drop action performed with respect to the content shared in the collaboration session by one of the at least two participants;
capturing corresponding metadata of the drag-and-drop action, wherein the corresponding metadata includes one or more sources that contributed to modifying the content of the collaboration session using the drag-and-drop action;
embedding, into a media stream associated with the content that is distributed to the respective devices of the at least two participants, the corresponding metadata of the drag-and-drop action into the content, wherein the one or more sources include information about a participant of the at least two participants and wherein the processor is configured to perform embedding of the corresponding metadata by:
presenting a plurality of style options in which to render the information about the participant, wherein the plurality of style options include a profile card style, a current participant frame style, or a textual style that includes textual identification information of the participant,
obtaining a selection of one of the plurality of style options, and
embedding the corresponding metadata, according to the selection, by one of the at least two participants.

20. The apparatus of claim 19, wherein the drag-and-drop action includes adding at least a portion of another application content into the content of the collaboration session and wherein the corresponding metadata further includes a timestamp to a corresponding portion of the media stream of the collaboration session.

21. The apparatus of claim 19, wherein the content of the collaboration session is presented in a main content area of a user interface screen that includes a meeting board section, and
wherein the drag-and-drop action includes adding a portion of the content displayed in the main content area to the meeting board section such that the meeting board section including the portion is displayed throughout the collaboration session while the content in the main content area changes throughout the collaboration session, wherein the participant initiated the drag-and-drop action.

* * * * *